(12) United States Patent
Kim et al.

(10) Patent No.: US 9,832,053 B2
(45) Date of Patent: Nov. 28, 2017

(54) METHOD AND APPARATUS FOR RECONSTRUCTING DESIRED SIGNAL IN CASE OF USING FULL DUPLEX RADIO (FDR) SCHEME

(71) Applicant: LG ELECTRONICS INC., Seoul (KR)

(72) Inventors: Jinmin Kim, Seoul (KR); Jaehoon Chung, Seoul (KR); Genebeck Hahn, Seoul (KR); Eunjong Lee, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 14/728,381

(22) Filed: Jun. 2, 2015

(65) Prior Publication Data
US 2016/0105211 A1    Apr. 14, 2016

Related U.S. Application Data

(60) Provisional application No. 62/061,181, filed on Oct. 8, 2014.

(51) Int. Cl.
*H04B 7/005* (2006.01)
*H04L 27/01* (2006.01)
*H04B 1/525* (2015.01)
*H04B 3/23* (2006.01)

(52) U.S. Cl.
CPC ............. *H04L 27/01* (2013.01); *H04B 1/525* (2013.01); *H04B 3/23* (2013.01)

(58) Field of Classification Search
CPC ....................................................... H04B 1/48
See application file for complete search history.

(56) References Cited

U.S. PATENT DOCUMENTS

| | | | |
|---|---|---|---|
| 2011/0143655 A1* | 6/2011 | Ahn | H04B 7/15542 455/9 |
| 2012/0063373 A1* | 3/2012 | Chincholi | H04L 5/001 370/281 |
| 2013/0089009 A1* | 4/2013 | Li | H04L 27/2601 370/278 |

* cited by examiner

*Primary Examiner* — Chi H Pham
*Assistant Examiner* — Fahmida Chowdhury
(74) *Attorney, Agent, or Firm* — Lee, Hong, Degerman, Kang & Waimey

(57) ABSTRACT

The apparatus for reconstructing a desired signal using a full duplex radio (FDR) scheme includes: a digital self-interference cancellation unit configured to output a first digital signal; a demodulator configured to demodulate the first digital signal; a modulator configured to modulate the demodulated first digital signal; an attenuator configured to attenuate the modulated first digital signal by applying an attenuation coefficient to the modulated first digital signal; and an operation unit configured to receive the attenuated first digital signal and the first digital signal, and transmit a residual signal to the digital self-interference cancellation unit, wherein the residual signal is obtained by subtracting the attenuated first digital signal from the first digital signal.

8 Claims, 14 Drawing Sheets before ADC after ADC after digital
cancellation
and
scaling

Received signal after ADC processing reference signal considering clipping level reference signal

METHOD AND APPARATUS FOR RECONSTRUCTING DESIRED SIGNAL IN CASE OF USING FULL DUPLEX RADIO (FDR) SCHEME

Pursuant to 35 U.S.C. §119(e), this application claims the benefit of U.S. Provisional Patent Application No. 62/061,181, filed on Oct. 8, 2014, the contents of which are hereby incorporated by reference herein in its entirety.

BACKGROUND OF THE INVENTION

Field of the Invention

The present invention relates to wireless communication, and more particularly, to a method and apparatus for reconstructing desired signal in case of using FDR scheme.

Discussion of the Related Art

A full duplex radio (FDR) or full duplex communication scheme refers to a communication scheme for simultaneously supporting transmission and reception using the same resource in one user equipment (UE). In this case, the same resource refers to the same time and the same frequency. FDR communication or full duplex communication is referred to as two-way communication.

FIG. 1 is a diagram illustrating concept of a UE and a base station (BS), which support FDR. Referring to FIG. 1, in a network state that supports FDR, there are three types of interferences. First interference is intra-device self-interference. The intra-device self-interference refers to interference caused by signals that are transmitted from a transmission (Tx) antenna and received by a receiving (Rx) antenna in one BS or UE. Since the signals transmitted from the Tx antenna are transmitted with high power and a distance between the Tx antenna and the Rx antenna is small, the transmitted signals are received by the Rx antenna while attenuation is barely caused, and thus, are received with higher power than a desired signal. Second interference is UE to UE inter-link interference. In a network that supports FDR, the UE to UE inter-link interference is increasingly caused. The UE to UE inter-link interference refers to interference caused by uplink signals that are transmitted from a UE and received by an adjacently positioned UE. Third interference is BS to BS inter-link interference. Similarly, in a network state that supports FDR, BS to BS inter-link interference is increasingly caused. The BS to BS inter-link interference refers to interference caused by signals that are transmitted between BSs or heterogeneous BSs (pico, femto, and relay) in a HetNet state and received by an Rx antenna of another BS.

Among the three types of interferences, the intra-device self-interference (hereinafter, referred to as self-interference) is influence of interference caused only in FDR. In order to manage FDR, a most serious problem is cancellation of self-interference. However, methods for effectively cancelling self-interference in an FDR state have not been discussed in detail.

SUMMARY OF THE INVENTION

Accordingly, the present invention is directed to a method and apparatus for reconstructing a desired signal in case of using a full duplex radio (FDR) scheme that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for reconstructing a desired signal using a full duplex radio (FDR) scheme includes: a digital self-interference cancellation unit configured to output a first digital signal; a demodulator configured to demodulate the first digital signal; a modulator configured to modulate the demodulated first digital signal; an attenuator configured to attenuate the modulated first digital signal by applying an attenuation coefficient to the modulated first digital signal; and an operation unit configured to receive the attenuated first digital signal and the first digital signal, and transmit a residual signal to the digital self-interference cancellation unit, wherein the residual signal is obtained by subtracting the attenuated first digital signal from the first digital signal, wherein the digital self-interference cancellation unit is configured to: receive a second digital signal before digital-to-analog conversion (DAC) processing is performed in a digital to analog converter (DAC) of a transmitting end and a third digital signal obtained after analog to digital conversion (ADC) processing is performed in an analog to digital converter (ADC) of a receiving end, and output a signal obtained after subtracting the second digital signal and the residual signal from the third digital signal.

The apparatus may further include: a deinterleaver configured to deinterleave the demodulated first digital signal; a channel decoder configured to perform channel decoding of the deinterleaved signal; a channel encoder configured to perform channel encoding of the channel decoded signal; and an interleaver configured to interleave the channel encoded signal, wherein the modulator is configured to modulate the interleaved signal. The attenuation coefficient applied by the attenuator may be set to a value enable mean square error of the modulated first digital signal and the first digital signal to have a lowest mean square error value.

The apparatus may further include: an equalizer, wherein the third digital signal is outputted from the equalizer after completion of ADC processing of the receiving end.

The apparatus may further include: an inverse fast Fourier transform (IFFT) unit, wherein the second digital signal is a signal obtained before IFFT processing by the IFFT unit.

In accordance with another aspect of the present invention, a method for reconstructing a desired signal using a full duplex radio (FDR) scheme includes: outputting a first digital signal; demodulating the first digital signal; modulating the demodulated first digital signal; attenuating the modulated first digital signal by applying an attenuation coefficient to the modulated first digital signal; receiving the attenuated first digital signal and the first digital signal, and transmitting a residual signal to the digital self-interference cancellation unit, wherein the residual signal is obtained by subtracting the attenuated first digital signal from the first digital signal; and receiving a second digital signal before digital-to-analog conversion (DAC) processing is performed in a digital to analog converter (DAC) of a transmitting end and a third digital signal obtained after analog to digital conversion (ADC) processing is performed in an analog to digital converter (ADC) of a receiving end, outputting a signal obtained after subtracting the second digital signal and the residual signal from the third digital signal.

The method may further include: deinterleaving the demodulated first digital signal; performing channel decoding of the deinterleaved signal; performing channel encoding of the channel decoded signal; and interleaving the channel encoded signal, wherein the modulating comprises modulating the interleaved signal. The attenuation coefficient may be set to a value enable mean square error of the modulated first digital signal and the first digital signal to have a lowest mean square error value. The third digital signal may be generated from an equalizer after completion of ADC processing of the receiving end. The second digital signal may be obtained before inverse fast Fourier transform (IFFT) processing by the IFFT unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 shows an example in which an interference signal has lower power than a desired signal and the desired signal is recovered after the interference signal is cancelled;

DESCRIPTION OF SPECIFIC EMBODIMENTS

Figure 1:
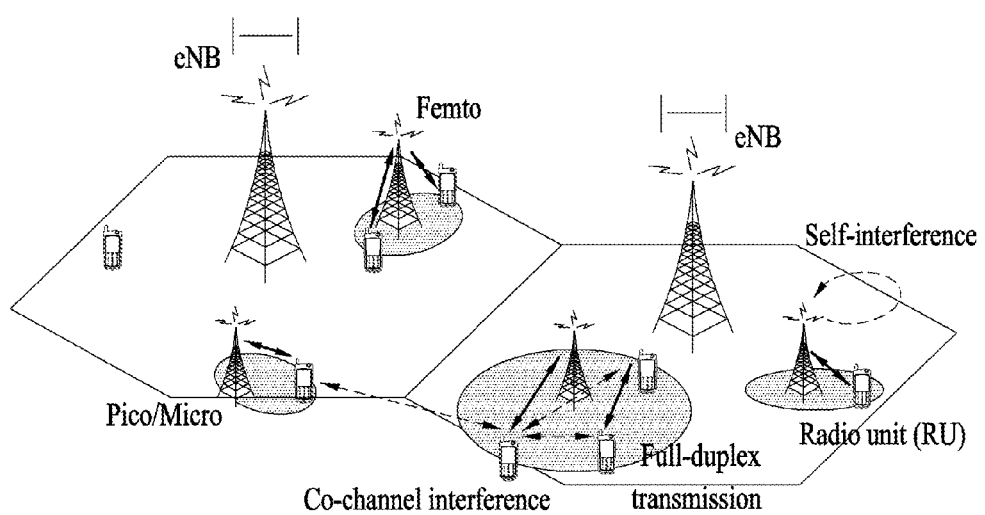
FIG. 1 is a diagram illustrating concept of a user equipment (UE) and a base station (BS), which support full duplex radio (FDR)

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A may be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an eNode B, a base station, access point (AP), etc. Throughout this specification, the technical features of the present invention are described based on an institute of electrical and electronic engineers (IEEE) 802.16 system, but may be applied to various other communication systems.

In a mobile communication system, a UE may receive information from a BS in downlink and transmit information in uplink. The information transmitted or received by the UE may be data and various control information. In addition, there are various physical channels according to the type or use of the information transmitted or received by the UE.

The following technical features can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communication (GSM)/general packet radio service (GPRS)/enhanced data rates for GSM evolution (EDGE), etc. OFDMA may be embodied through radio technology such as IEEE 802.11 (Wi-Fi), IEEE 802.16 (WiMAX), IEEE 802-20, evolved UTRA (E-UTRA), and the like. UTRA is a part of a universal mobile telecommunications system (UMTS). 3GPP LTE is a part of evolved UMTS (E-UMTS), which uses E-UTRA. The 3GPP LTE employs OFDMA in downlink and employs SC-FDMA in uplink. LTE advanced (LTE-A) is an evolved version of 3GPP LTE.

It should be noted that specific terms disclosed in the present invention are proposed for convenience of description and better understanding of the present invention, and the use of these specific terms may be changed to other formats within the technical scope or spirit of the present invention.

Figure 2:
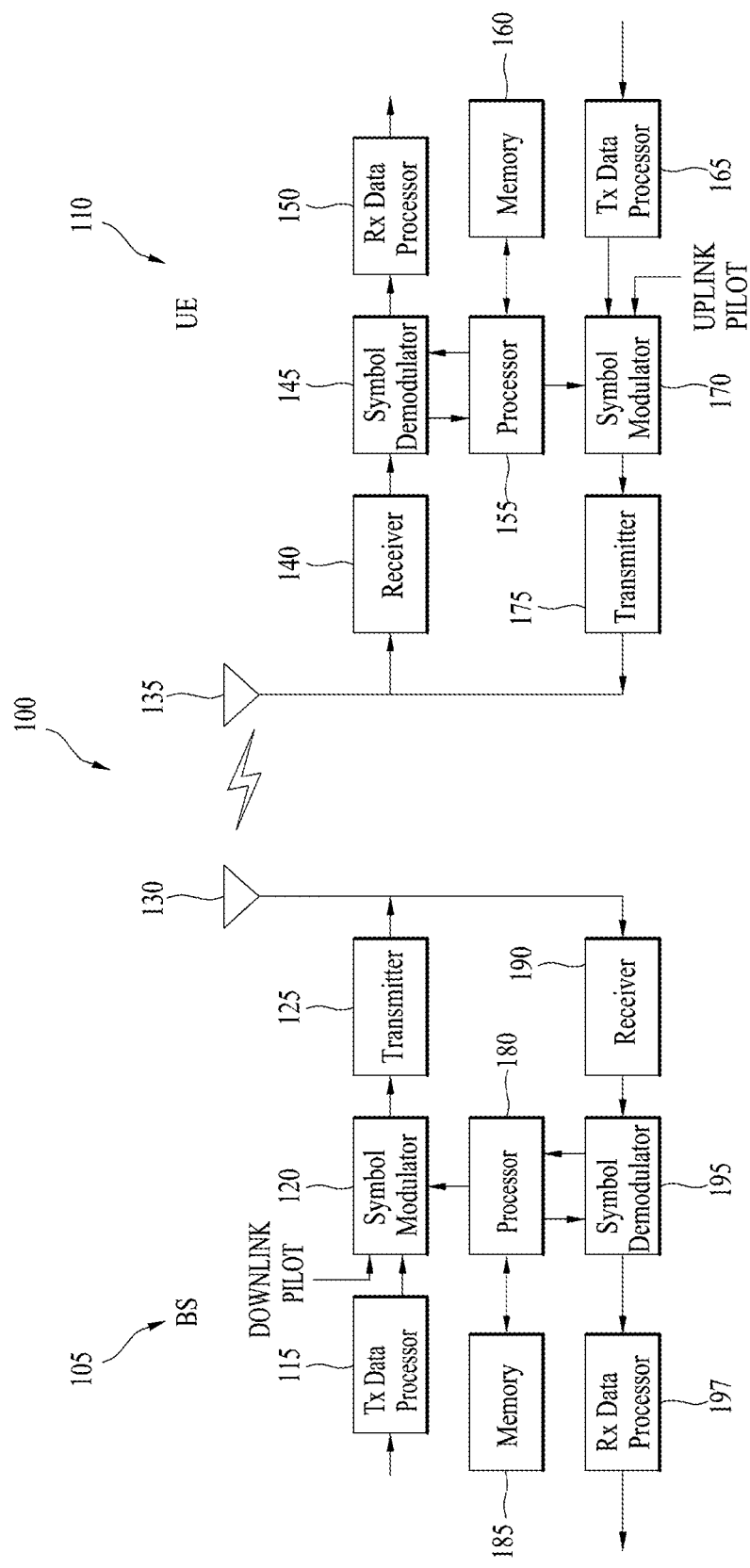
FIG. 2 is a block diagram illustrating a structure of BS and a UE 110 in a wireless communication system.

FIG. 2 is a block diagram illustrating a structure of a base station (BS) 105 and a user equipment (UE) 110 in a wireless communication system 100.

Although one BS 105 and one UE 110 (including a D2D UE) are illustrated in order to simply illustrating the wireless communication system 100, the wireless communication system 100 may include one or more BSs and/or one or more UEs.

Referring to FIG. 2, the BS 105 may include a transmission (Tx) data processor 115, a symbol modulator 120, a transmitter 125, a Tx/Rx antenna 130, a processor 180, a memory 185, a receiver 190, a symbol demodulator 195, and a reception (Rx) data processor 197. In addition, the UE 110 may include a Tx data processor 165, a symbol demodulator 170, a transmitter 175, a Tx/Rx antenna 135, a processor 155, memory 160, a receiver 140, a symbol demodulator 145, and an Rx data processor 150. Although FIG. 2 illustrates that each of the BS 105 and the UE 110 includes the Tx/Rx antennas 130 and 135, respectively, each the BS 105 and the UE 110 includes a plurality of Tx/Rx antennas. Accordingly, the BS 105 and the UE 110 according to the present invention support a multiple input multiple output (MIMO) system. In addition, the BS 105 according to the present invention may support both single user-MIMO (SU-MIMO) and multi user-MIMO (MU-MIMO) schemes.

In downlink, the Tx data processor 115 receives traffic data, formats and codes the received traffic data, and interleaves and modulates (or symbol-maps) the coded traffic data to provide modulated symbols ("data symbols"). The symbol modulator 120 receives and processes the data symbols and pilot symbols to provide a stream of symbols.

The symbol modulator 120 multiplexes the data and pilot symbols and transmits the multiplexed data and pilot symbols to the transmitter 125. In this case, each transmitted symbol may be a data symbol, a pilot symbol, or a zero signal value. In each symbol period, pilot symbols may be consecutively transmitted. The pilot symbols may each be a frequency division multiplexing (FDM) symbol, an orthogonal frequency division multiplexing (OFDM) symbol, a time division multiplexing (TDM) symbol, or a code division multiplexing (CDM) symbol.

The transmitter 125 receives the stream of symbols, converts the stream into one or more analog signals, and further adjusts (e.g., amplifies, filters, and frequency-upconverts) the analog signals to generate a downlink signal appropriate for transmission via a radio channel. Then the Tx antenna 130 transmits the generated downlink signal to the UE 110.

In the structure of the UE 110, the Rx antenna 135 receives the downlink signal from the BS 105 and provides the received signal to the receiver 140. The receiver 140 adjusts (e.g., filters, amplifies, and frequency-downconverts) the received signal and digitizes the adjusted signal to acquire samples. The symbol demodulator 145 demodulates the received pilot symbols and provides the pilot symbols to the processor 155 for channel estimation.

In addition, the symbol demodulator 145 receives a frequency response estimated value for downlink from the processor 155, data-demodulates the received data symbols to acquires data symbol estimated values (which is estimated values of the transmitted data symbols), and provides the data symbol estimated values to the Rx data processor 150. The Rx data processor 150 demodulates (i.e., symbol-demaps), deinterleaves, and decodes the data symbol estimated values to recover the transmitted traffic data.

Processing operations by the symbol demodulator 145 and the Rx data processor 150 are complementary to processing operations of the symbol modulator 120 and the Tx data processor 115 in the BS 105, respectively.

In uplink, the Tx data processor 165 of the UE 110 processes traffic data to provide data symbols. The symbol demodulator 170 may receive and modulate the data symbols and provide a stream of the symbols to the transmitter 175. The transmitter 175 receives and processes the stream of symbols to generate an uplink signal. In addition, the Rx antenna 135 transmits the generate uplink signal to the BS 105.

In the BS 105, an uplink signal from the UE 110 is received by the Rx antenna 130, and the receiver 190 processes the received uplink signal to acquire samples. Then the symbol demodulator 195 processes the samples to provide pilot symbols and data symbol estimated values which are received for downlink. The reception (Rx) data processor 197 processes the data symbol estimated values to recover the traffic data transmitted from the UE 110.

The processors 155 and 180 of the UE 110 and the BS 105 order (e.g., controls, manipulates, manages, etc.) operations of the UE 110 and the BS 105, respectively. The processors 155 and 180 may be respectively connected to the memories 160 and 185 which store program codes and data. The memories 160 and 185 are respectively connected to the processors 155 and 180 and store an operating system, application, and general files.

The processors 155 and 180 may be referred to as a controller, a microcontroller, a microprocessor, a microcomputer, or the like. The processors 155 and 180 may each be embodied by hardware, firmware, software, or a combination thereof. When an embodiment of the present invention is embodied by hardware, the processors 155 and 180 may include application specific integrated circuits (ASICs), digital signal processors (DSPs), digital signal processing devices (DSPDs), programmable logic devices (PLDs), field programmable gate arrays (FPGAs), or the like which is configured to execute the present invention.

When an embodiment of the present invention is embodied by firmware or software, firmware or software may be configured in the form of a module, a procedure, a function, etc. which perform function or operations according to the present invention. Firmware or software configured to implement the present invention may be included in the processors 155 and 180 or stored in the memories 160 and 185 and driven by the processors 155 and 180.

Layers of a wireless interface protocol between wireless communication systems (network) of the UE 110 and the BS 105 may be classified into a first layer L1, a second layer L2, and a third layer L3 based on three lower layers of an open system interconnection (OSI) model that is well known in a communication system. A physical layer belongs to the first layer L1 and provides an information transfer service through a physical channel. A radio resource control (RRC)

layer belongs to the third layer (L3) and provides control radio resources between the UE 110 and a network. The UE 110 and the BS 105 may exchange RRC messages through a wireless communication network and an RRC layer.

Throughout this specification, the processor 155 of the UE 110 and the processor 180 of the BS 105 perform an operation for processing signals and data except for a function of receiving or transmitting signals by the UE 110 and the BS 105 or a storing function. However, hereinafter, for convenience of description, the processors 155 and 180 will not be specially stated. Unless the processors 155 and 180 are not stated, a series of operations such as data processing but not the function of transmitting or receiving signals and the storing function may be performed.

Figure 3:
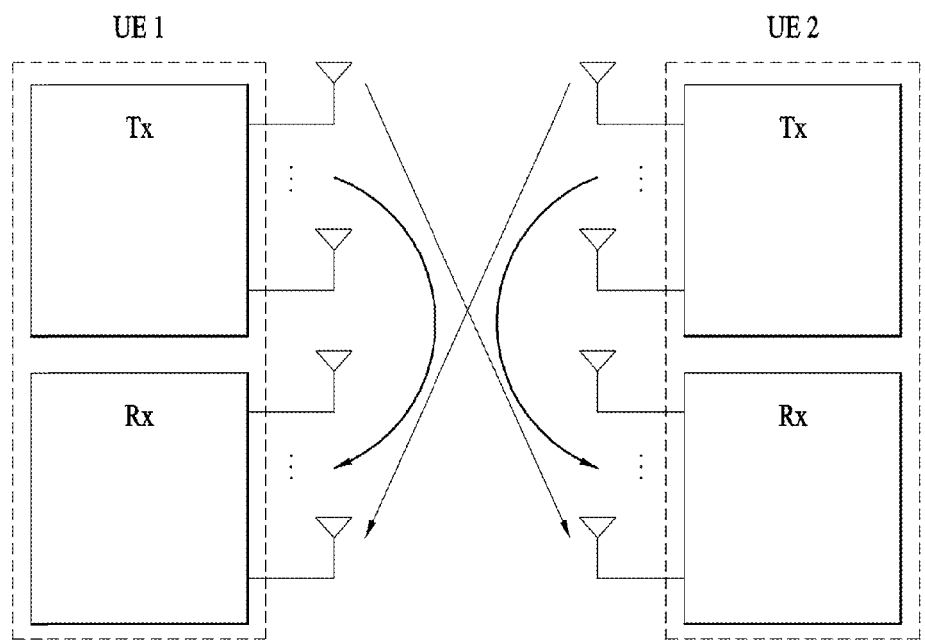
FIG. 3 is a diagram illustrating concept of self-interference.

FIG. 3 is a diagram illustrating concept of self-interference.

As illustrated in FIG. 3, a signal transmitted from a UE is received by an Rx antenna of the UE and acts as interference. This interference has different characteristic from other interferences. According to the first characteristic, a signal that acts as interference may be considered as a completely known signal. According to the second characteristic, power of a signal that acts as interference is very high compared with a desired signal. Due to this point, even if a signal that acts as interference is completely known, the interference cannot be completely cancelled at a receiver (or receiving end). The receiver uses an analog to digital converter (ADC) in order to convert a signal received by the receiver into a digital signal. In general, the ADC measures power of a received signal, adjusts a power level of the received signal according to the measured power, quantizes the received signal, and then, converts the signal into a digital signal. However, since an interference signal is received with higher power than a desired signal, the signal characteristic of the desired signal is covered by a quantization level during the quantization, and thus, the signal cannot be recovered.

Figure 4:
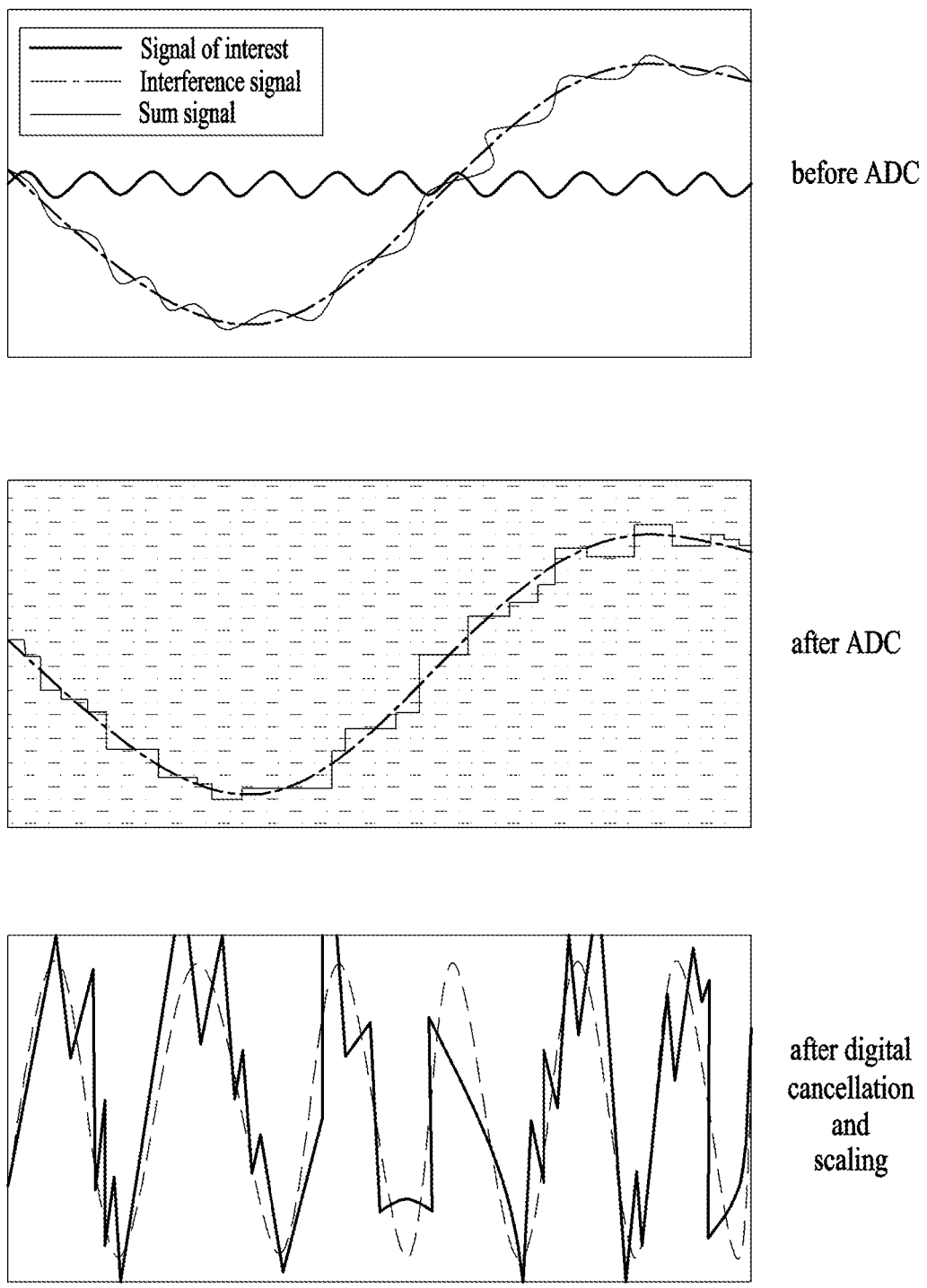
FIG. 4 is a diagram illustrating signal distortion due to quantization errors and FIG. 5 is a diagram illustration signal recovery when quantization errors are low.
Figure 5:
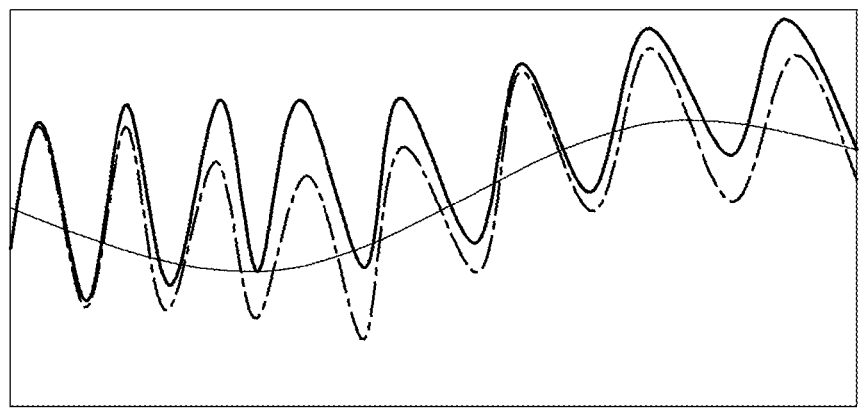
Figure 5:
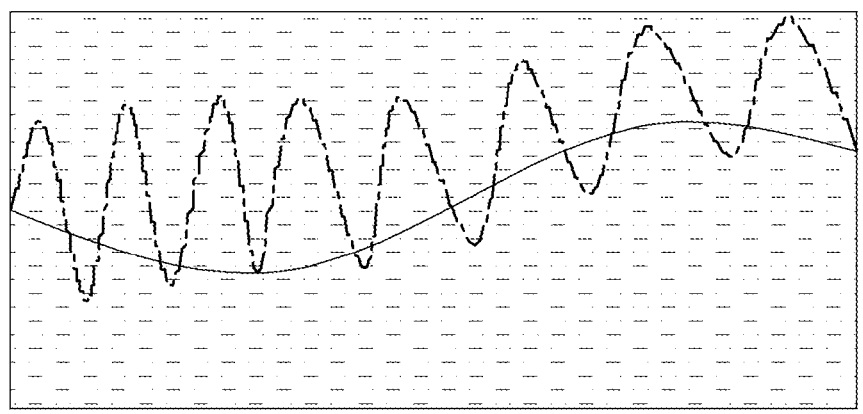
Figure 5:
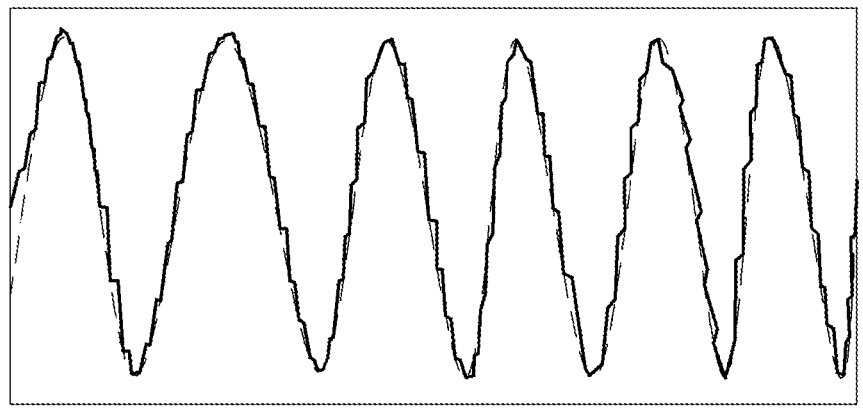

FIG. 4 is a diagram illustrating signal distortion due to quantization errors. FIG. 5 is a diagram illustration signal recovery when quantization errors are low.

In FIG. 4, for example, quantization is assumed to be 4 bits. As seen from FIG. 4, when an interference signal has much higher power than a desired signal, if quantization is performed, even if the interference signal is cancelled, the desired signal is highly distorted. On the other hand, FIG. 5 shows an example in which an interference signal has lower power than a desired signal and the desired signal is recovered after the interference signal is cancelled. In this situation, a scheme for cancelling self-interference may be classified into 4 schemes according to a position in which the scheme is performed.

Figure 6:
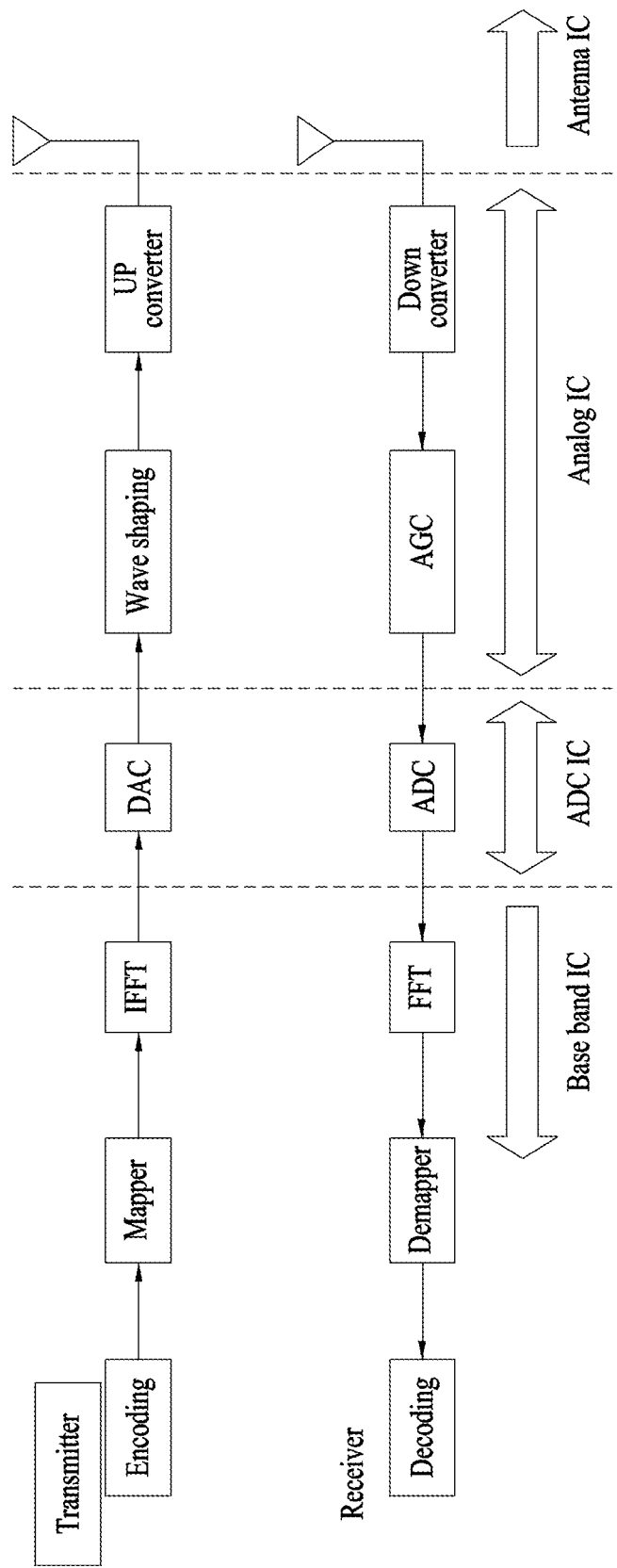
FIG. 6 is a diagram for explanation of a scheme for cancelling self-interference.

FIG. 6 is a diagram for explanation of a scheme for cancelling self-interference.

Referring to FIG. 6, the scheme for cancelling self-interference may be classified into 4 schemes of a baseband IC scheme, an ADC IC scheme, an analog IC scheme, and an antenna IC scheme according to a position in which the scheme is performed.

Figure 7:
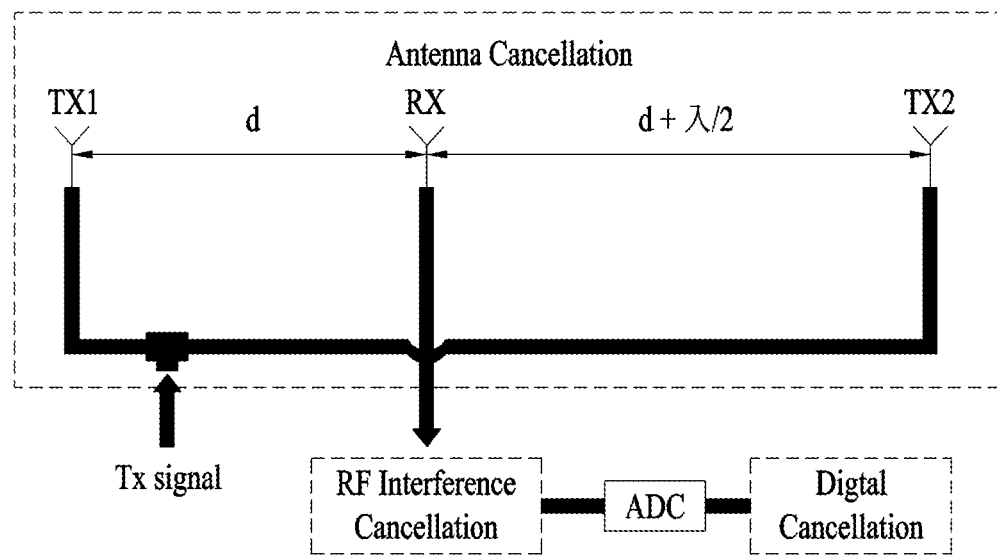
FIG. 7 is a diagram for explanation of an antenna interference cancellation (IC) scheme using a distance between antennas.

FIG. 7 is a diagram for explanation of an antenna IC scheme using a distance between antennas.

The antenna IC scheme can be implemented via a simplest method among all IC schemes and can be performed as shown in FIG. 7. That is, one UE cancels interference using three antennas and uses two antennas as a Tx antenna and one antenna as an Rx antenna among the three antennas. The two Tx antennas are installed at a distance difference corresponding to about wavelength/2 based on the Rx antenna in order to receive a signal transmitted from each Tx antenna as a signal, a phase of which is inversed, in terms of the Rx antenna. Accordingly, an interference signal among signals that are lastly received by the Rx antenna converges toward 0. Alternatively, in order to inverse a phase of a second Tx antenna, an interference signal can be cancelled using a phase shifter as illustrated in FIG. 8 without using a distance between antennas as illustrated in FIG. 7.

Figure 8:
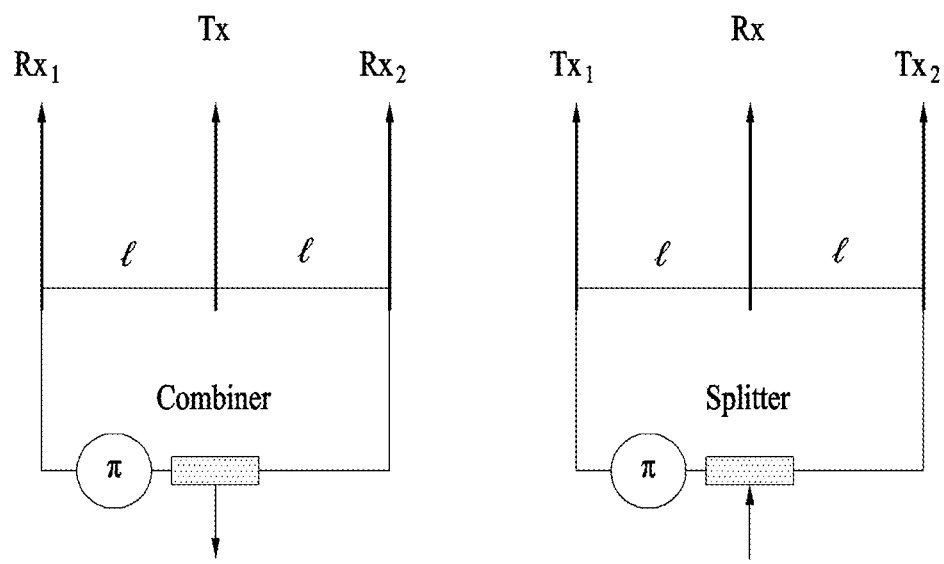
FIG. 8 is a diagram for explanation of an antenna IC scheme using a phase shifter.

FIG. 8 is a diagram for explanation of an antenna IC scheme using a phase shifter.

Figure 9:
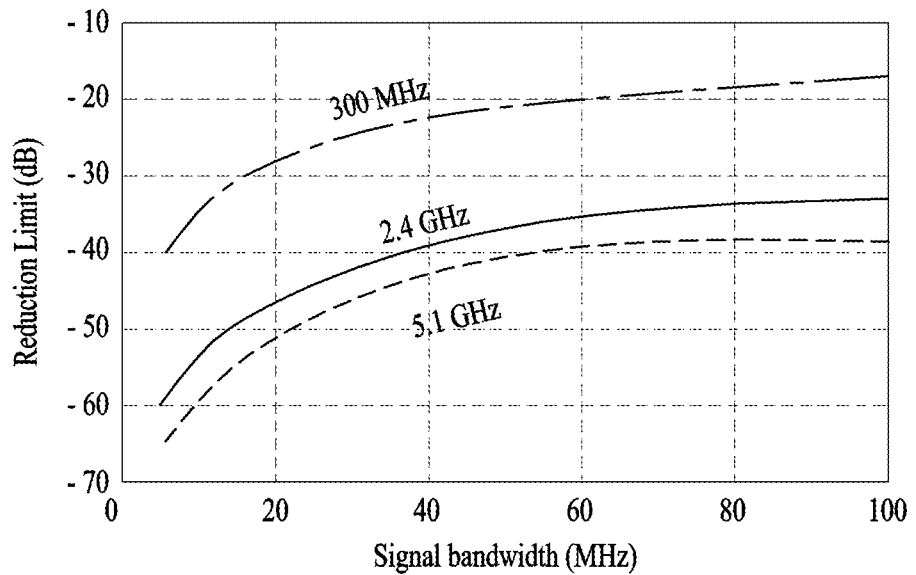
FIG. 9 illustrates interference cancelling performance according to a bandwidth and center frequency of a signal.

In FIG. 8, a left diagram illustrates a scheme for cancelling self-interference using two Rx antennas and a right diagram illustrates a scheme for cancelling interference using two Tx antennas. These antenna interference cancelling schemes are affected by a bandwidth and center frequency of a transmitted signal. As a bandwidth of a transmitted signal is reduced and a center frequency of the transmitted signal is increased, interference cancelling performance is more strengthened. FIG. 9 illustrates interference cancelling performance according to a bandwidth and center frequency of a signal. As illustrated in FIG. 9, as a bandwidth of a transmitted signal is reduced and a center frequency of the transmitted signal is increased, interference cancelling performance is more strengthened.

An ADC IC scheme will now be described. The ADC IC scheme refers to a technology for easily cancelling interference by maximizing the performance of an ADC that has a most serious problem in that interference cannot be cancelled even if an interference signal is pre-known. Although it is disadvantageous in that the ADC IC scheme cannot be applied due to quantization bit limitation of the ADC for actual embodiment, self-interference cancellation performance required by a trend of gradually improving ADC performance may be lowered.

An analog IC scheme will now be described. The analog IC scheme is a scheme for cancelling interference prior to an ADC and cancels self-interference using an analog signal. The analog IC scheme may be performed in a radio frequency (RF) region or performed in an IF region. Interference is cancelled simply by phase and time-lagging a transmitted analog signal and subtracting the analog signal from a signal received by an Rx antenna. The analog IC scheme is advantageous in that only one Tx antenna and one Rx antenna are required unlike the antenna IC scheme. However, since processing is performed using an analog signal, distortion may further occur due to complex implementation and circuit characteristic, thereby highly changing interference cancellation performance.

A digital IC scheme will now be described. The digital IC scheme refers to a scheme for cancelling interference after an ADC and includes any interference cancelation performed in a base band region. As a simplest scheme is embodied by subtracting a transmitted digital signal from a received digital signal. Alternatively, a UE or BS that transmits signals using multi antennas may perform beamforming or precoding so as not to receive the transmitted signal by an Rx antenna. In this regard, when these schemes are performed in a base band, these schemes may also be classified as digital IC. However, the digital IC is possible when a signal modulated in a digital form is quantized so as to recover information about a desired signal. Accordingly, the digital IC is disadvantageous in that an amplitude difference of signal power between a desired signal and an interference signal obtained by cancelling interference via one or more scheme among the above schemes needs to be within an ADC range in order to perform the digital IC.

Figure 10:
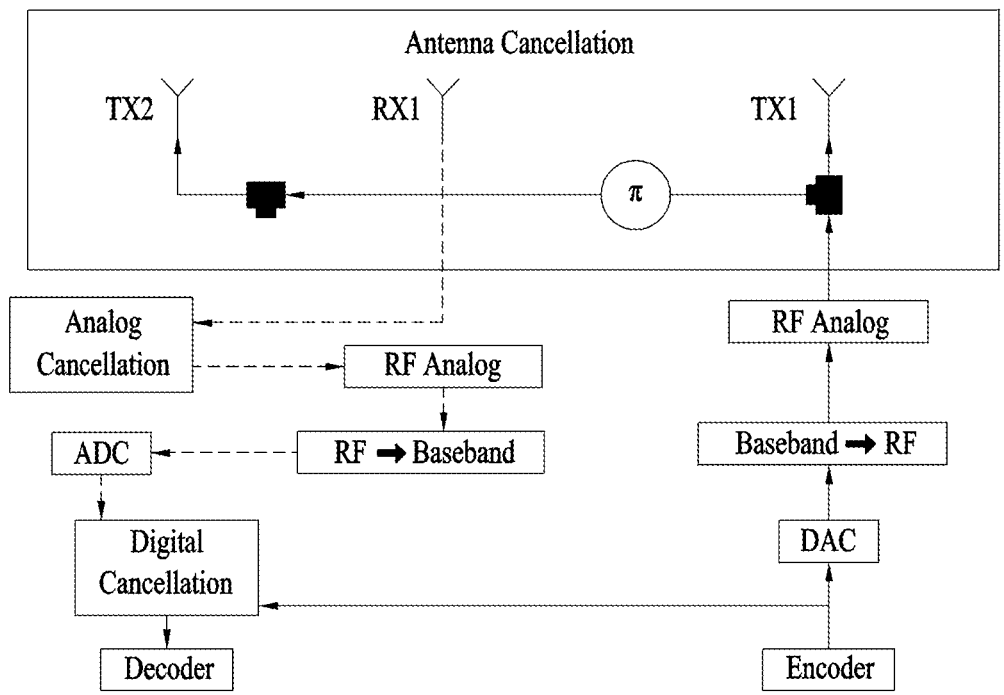
FIG. 10 is a diagram illustrating a system obtained by combining interference cancellation (IC) schemes.

FIG. 10 is a diagram illustrating a system obtained by combining interference cancellation (IC) schemes.

The system illustrated in FIG. 10 is a system to which the above schemes are simultaneously applied and overall interference cancellation performance is improved by combining interference cancellation schemes of respective regions. A scheme proposed according to the present invention proposes a series of procedures and frame structure for cancelling self-interference via a simplest antenna IC scheme among the above schemes and improving overall cell throughput. However, when all of the analog, ADC, and digital IC schemes as well as the antenna IC schemes are applied, even if the scheme proposed according to the present invention, cell throughput may also be improved.

General analog cancellation is achieved via a subtraction method prior to a low noise amplifier (LNA) of a receiver using a signal after a power amplifier (PA) of a transmitter (or transmitting end). This is because influence of a signal received by an actual antenna can be effectively reflected only when the signal is extracted from a last node of the transmitter.

Figure 11:
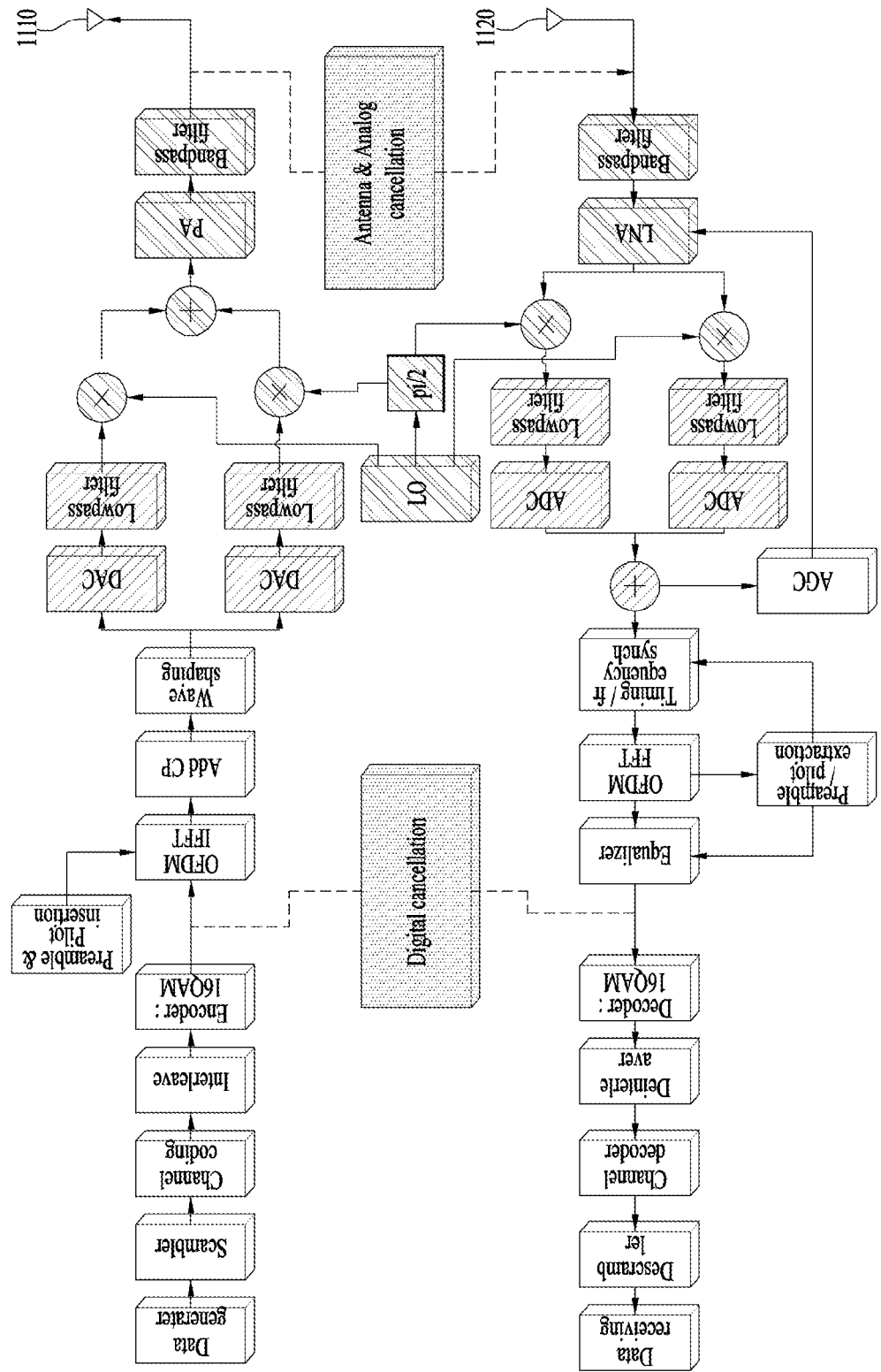
FIG. 11 is a block diagram of Tx chain and Rx chain for interference cancellation in an environment in which orthogonal frequency division multiplexing (OFDM) is used.

FIG. 11 is a block diagram of Tx chain and Rx chain for interference cancellation in an environment in which orthogonal frequency division multiplexing (OFDM) is used.

In the block diagram of FIG. 11, functional blocks according to their purposes may be added or omitted. In addition, a digital cancellation block may be located after an IFFT unit. However, digital cancellation may be performed directly using digital signal before a DAC and a digital signal after an ADC or performed using a signal before an FFT unit and a signal after an IFFT unit. In addition, FIG. 11 is a conceptual diagram for separating a Tx antenna and an Rx antenna and cancelling a self-interference signal, but an antenna configuration may be changed when FDR is possible using one antenna.

Although FIG. 11 exemplarily illustrates that signals are physically transmitted and received through two antennas, respectively, signals may also be transmitted and received through a single antenna as necessary. Individual blocks of the Tx chain are configured to time-serially process signals in the direction of an arrow, and transmit the processed signals to the Tx antenna 1110. Signals received through the Rx antenna 1120 are processed by individual blocks contained in the Rx chain in the direction of an arrow. Although individual blocks are shown in FIG. 11, detailed description and functions thereof are omitted.

As can be seen from FIG. 11, the ADC-processed digital signal is used to perform digital cancellation in the Rx chain. In this case, the digital signal is obtained after the antenna and analog cancellation are performed, has the residual self-interference, and is still large in magnitude.

Figure 12:
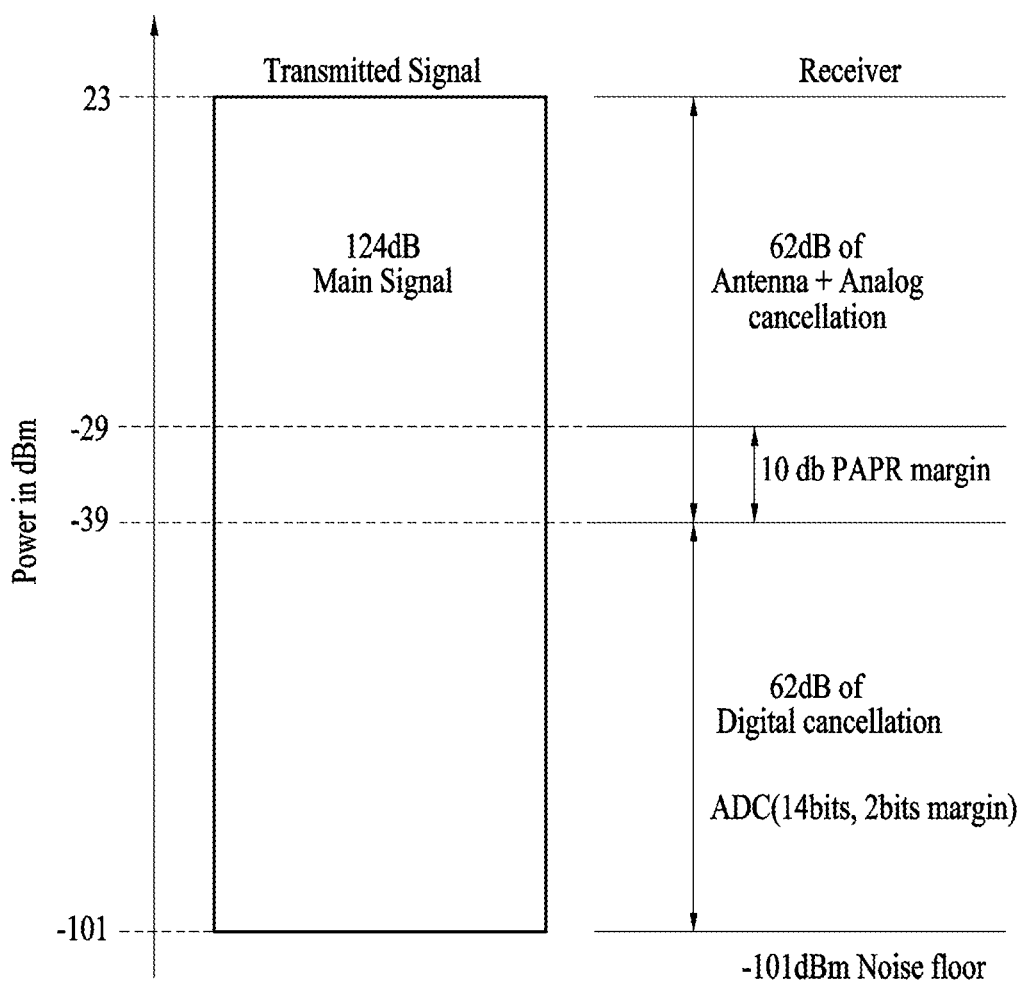
FIG. 12 shows the residual self-interference power in which UE transmission (Tx) power and a bandwidth are considered.

FIG. 12 shows the residual self-interference power in which UE transmission (Tx) power and a bandwidth are considered.

Referring to FIG. 12, when considering UE Tx power (23 dBm) and 20 MHz system bandwidth (BW), the residual self-interference power of 62 dB remains. Although the antenna and analog cancellation performance must have a minimum of 62 dB in consideration of ADC resolution bits, it is assumed that the antenna and analog cancellation performance has performance of 62 dB to reduce implementation load of the analog element. In addition, a noise floor level can be derived through the following equation 1, and maximum Tx power for each BS type is shown in the following Table 1.

$$N_{0,BW} = -174 \text{ dBm} + 10 \times \log_{10}(BW) \quad \text{[Equation 1]}$$

TABLE 1

| Node type | Max. Tx power | Noise Floor (3 W = 20 MHz) | Target |
|---|---|---|---|
| Macro eNB | 46 dBm | −101 dBm | 147 dB |
| Pico eNB | 30 dBm | | 131 dB |
| Femto eNB | 20 dBm | | 121 dB |
| UE | 23 dBm | | 124 dB |

Meanwhile, the ADC-processed signal may include not only the residual self-interference signal but also a desired signal. However, the residual self-interference is very higher than the desired signal, so that the desired signal may be distorted by ADC dynamic range. This signal distortion may also be represented by clipping distortion and/or quantization error.

Figure 13A:
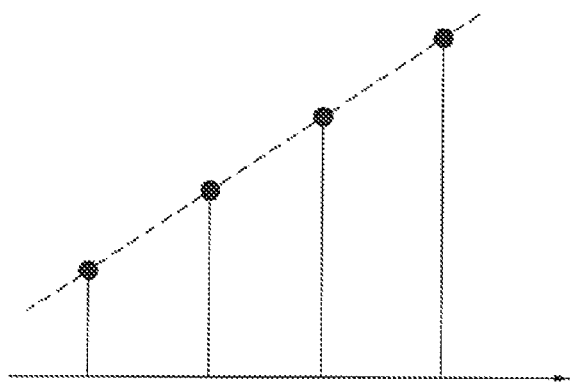
FIG. 13A illustrates the magnitude of a residual self-interference signal.
Figure 13B:
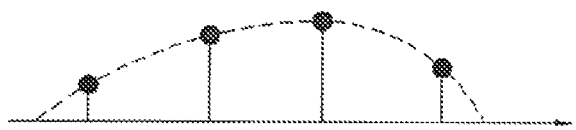
FIG. 13B illustrates the magnitude of a desired signal.
Figure 13C:
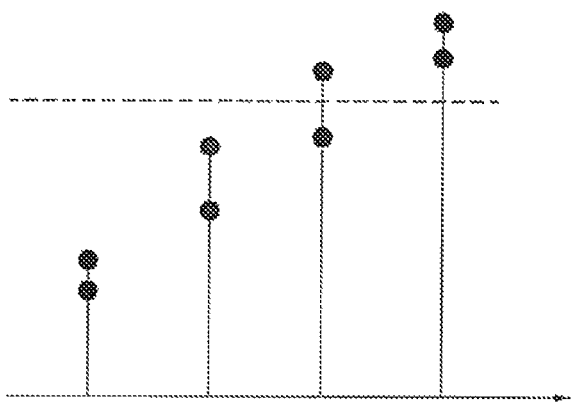
FIG. 13C illustrates the magnitude of a received signal.

FIG. 13A illustrates the magnitude of a residual self-interference signal, FIG. 13B illustrates the magnitude of a desired signal, and FIG. 13C illustrates the magnitude of a received signal.

For example, assuming that the residual self-interference shown in FIG. 13A is present and the desired signal shown in FIG. 13B is present, the signal before passing through the ADC may be represented as shown in FIG. 13C. Since the signal before passing through the ADC is an analog signal, this signal is received in a serial format denoted by dotted lines of FIGS. 13A-13C. However, the ADC-processed digital signal is also shown in FIGS. 13A-13C for convenience of description and better understanding of the present invention.

However, if high peak power instantaneously occurs due to PAPR (peak to average power ratio) characteristics of OFDM (orthogonal frequency division multiplexing), and the peak power exceeds the ADC dynamic range, the clipping error may occur. Alternatively, the ADC dynamic range is set to a small range so as to reduce the quantization error, the clipping error may also occur. That is, if the part denoted by dotted lines shown in FIG. 13C indicates the ADC clipping level, the ADC output signal (i.e., the received digital signal) is clipped in a specific region (i.e., a signal region located above the dotted level of FIGS. 13A-13C) in which the ADC output signal exceeds the corresponding clipping level, and clipping distortion occurs in the ADC output signal as shown in FIG. 14, so that the ADC output signal is represented by a digital signal.

Figure 14:
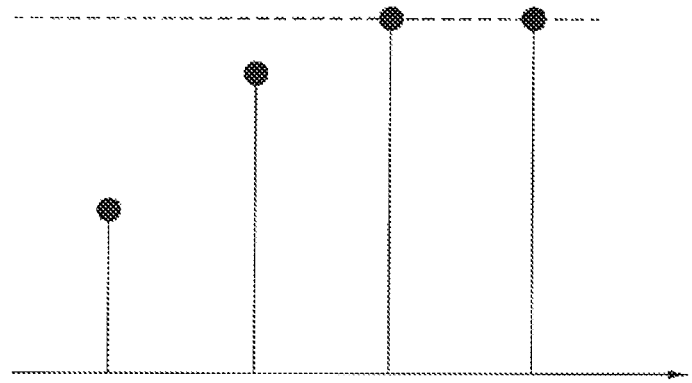
FIG. 14 illustrates a digital signal in which ADC-processed reception (Rx) signals are clipped.

FIG. 14 illustrates a digital signal in which ADC-processed reception (Rx) signals are clipped.

A general digital self-interference cancellation scheme enables a digital signal generated from a transmission (Tx) end (or a Tx chain) to be identical to the received self-interference signal, modifies the digital signal in a similar way to the received self-interference signal, and subtracts the modified digital signal. In this case, a signal generated for cancellation using the signal generated from the transmission end is referred to as a reference signal.

Figure 15A:
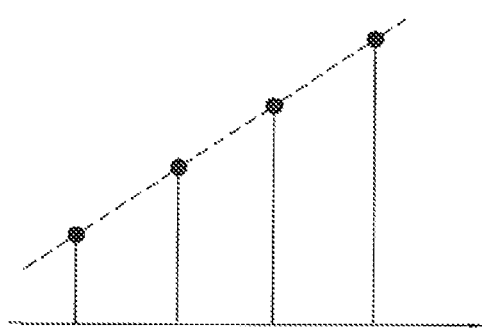
FIG. 15A illustrates the magnitude of a reference signal.
Figure 15B:
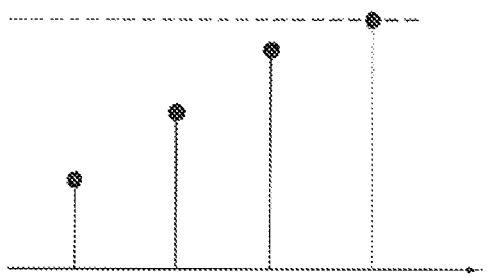
FIG. 15B illustrates the magnitude of a reference signal in which a clipping level is considered.

FIG. 15A illustrates the magnitude of a reference signal, and FIG. 15B illustrates the magnitude of a reference signal in which a clipping level is considered.

The reference signal is generated in the same manner as in the residual self-interference signal as shown in FIG. 15A, and the magnitude of a signal exceeding the clipping level of a dotted line can be limited to the clipping level as shown in FIG. 15B. In this case, the clipping level is performed in ADC contained in one UE, so that the corresponding UE can sufficiently recognize the clipping level.

Figure 16A:
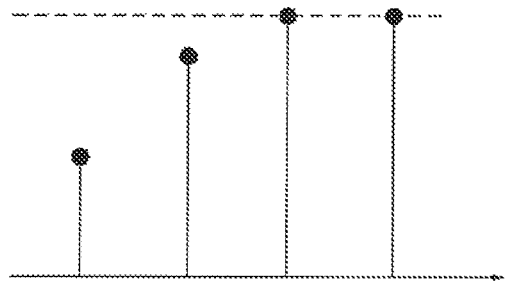
FIG. 16A illustrates the magnitude of a digital signal in which some parts of ADC-processed reception (Rx) signals shown in FIG. 14 are clipped.
Figure 16B:
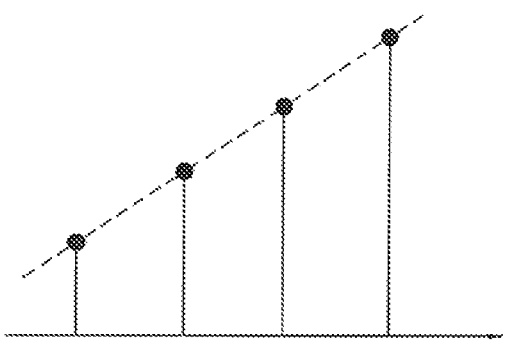
FIG. 16B illustrates the magnitude of a reference signal shown in FIG. 15A.
Figure 16C:
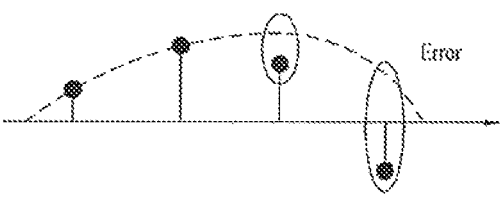
FIG. 16C illustrates the magnitude of a signal obtained when the signal shown in FIG. 16B is subtracted from the signal shown in FIG. 16A.

If the reference signal is subtracted from the received signal as shown in FIG. 15A, the subtracted result may appear as shown in FIGS. 16A-16C.

FIG. 16A illustrates the magnitude of a digital signal in which some parts of ADC-processed reception (Rx) signals shown in FIG. 14 are clipped, FIG. 16B illustrates the magnitude of a reference signal shown in FIG. 15A, and FIG. 16C illustrates the magnitude of a signal obtained when the signal shown in FIG. 16B is subtracted from the signal shown in FIG. 16A. That is, FIG. 16C illustrates that self-interference is subtracted from the digital signal in which the ADC-processed reception signal is clipped. In FIG. 16C, the dotted line may indicate a desired signal, and a circular solid line may indicate the magnitude of an error obtained after subtraction. In addition, even when the reference signal shown in FIG. 15B is subtracted from the ADC-processed reception signal, the error may occur as shown in FIG. 16C.

As described above, when the signal exceeding the clipping level is received although the self-interference signal is perfectly reconstructed and removed in the digital region, some samples are clipped and output through the ADC, and distortion occurs, so that reception (Rx) performance of a desired signal is deteriorated. In order to address this issue, the present invention proposes a method for overcoming the Rx performance deterioration of the desired signal.

Figure 17:
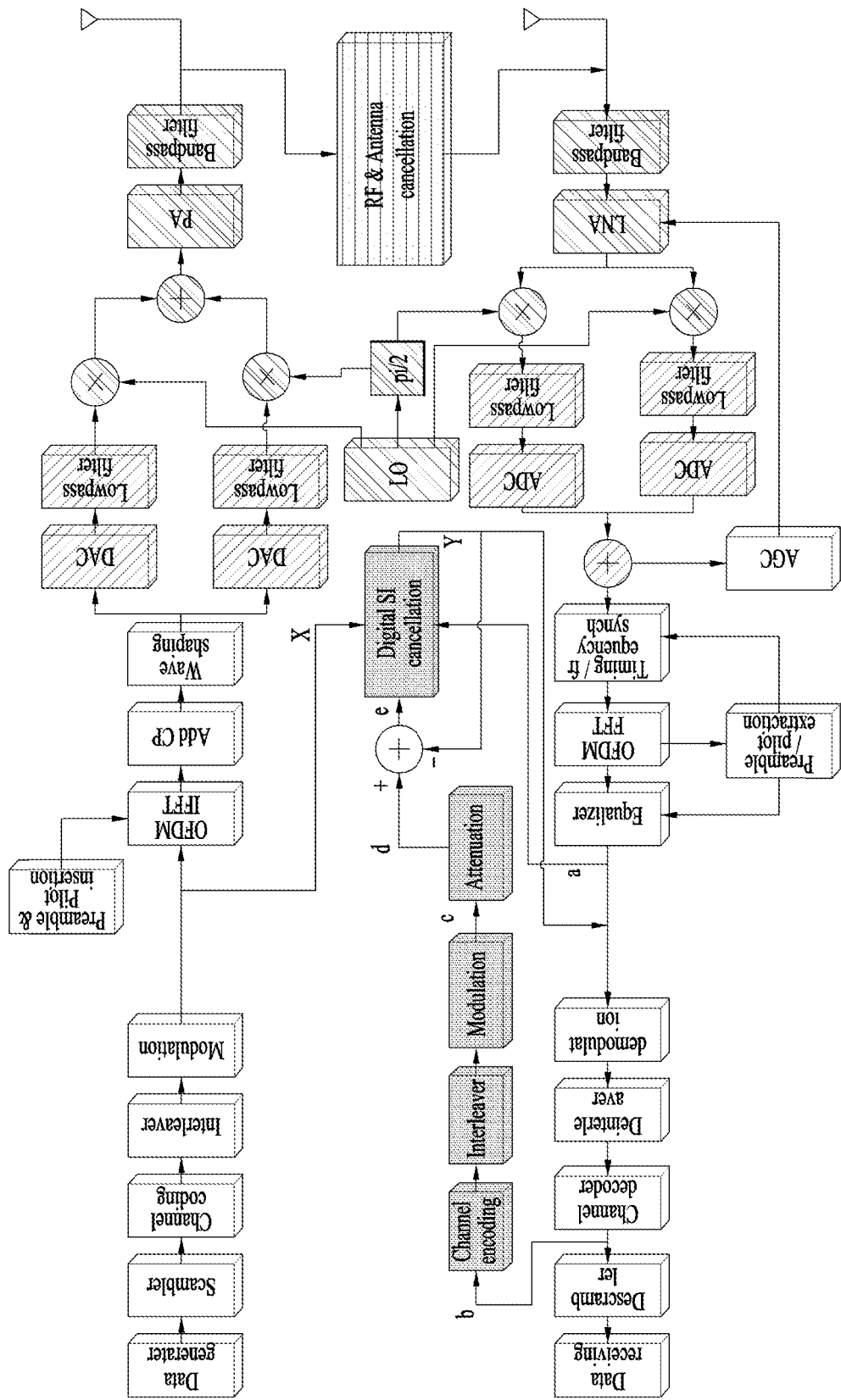
FIG. 17 is a block diagram illustrating a transmission (Tx) chain and a reception (Rx) chain configured to cancel a self-interference signal using desired signal reconstruction in a device according to the present invention.

FIG. 17 is a block diagram illustrating a transmission (Tx) chain (or a transmission end) and a reception (Rx) chain (or a reception end) configured to cancel a self-interference signal using desired signal reconstruction in a device according to the present invention. 'a' is defined as a signal Referring to FIG. 17, 'a' is defined as a signal obtained when a signal passes through the equalizer in the Rx chain (or the reception end). The signal 'a' (shown in FIG. 17) generated from the equalizer is input to a digital SI cancellation unit. The signal Y generated from the digital SI cancellation unit is composed of bits obtained when demodulation (or demapping), deinterleaving, channel decoding, etc. are performed, and is defined as a signal V.

In addition, the signal (c) may indicate a modulation symbol obtained when the opposite process of blocks used for demodulation of the signal (b) are performed. (The above process is identical to a modulation process of a desired signal but not a modulation process achieved in the transmitter contained in the corresponding UE) In order to reconstruct signal attenuation caused by clipping, the signal (c) is a signal having passed through the attenuator, and is defined as a signal (d). The signal (e) may indicate a signal obtained when the signal (y) is subtracted from the signal (d). The signal (X) may indicate the self-interference signal generated from a transmission end contained in one device (one UE). The signal (Y) is initially generated by subtracting the signal (X) from the signal (a). Thereafter, the signal obtained when the signals (X, e) are simultaneously subtracted from the signal (a) may be defined as the signal (Y'). As described above, the signal (Y) may be replaced with the signal (Y'). Thereafter, if the above steps starting from the step in which the previous signal (Y) is processed as the signal (b) are repeated N times, the next signal (Y') can be obtained.

In the meantime, although the proposed scheme has been disclosed using the channel encoding and decoding block, the channel encoding and decoding block may not be used for simplicity of implementation. In addition, a parameter value of attenuation (i.e., an attenuation coefficient) may be set to a specific value through which each of the signals (c, Y) has the lowest mean square error value.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for reconstructing a desired signal using a full duplex radio (FDR) scheme, the apparatus comprising:
    a digital self-interference cancellation unit configured to output a first digital signal;
    a demodulator configured to demodulate the first digital signal;
    a modulator configured to modulate the demodulated first digital signal;
    an attenuator configured to attenuate the modulated first digital signal by applying an attenuation coefficient to the modulated first digital signal; and
    an operation unit configured to receive the attenuated first digital signal and the first digital signal and to transmit a residual signal to the digital self-interference cancellation unit, the residual signal obtained by subtracting the attenuated first digital signal from the first digital signal,
    wherein the digital self-interference cancellation unit is further configured to:
    receive a second digital signal before digital-to-analog conversion (DAC) processing is performed in a digital to analog converter (DAC) of a transmitting end;
    receive a third digital signal obtained after analog to digital conversion (ADC) processing is performed in an analog to digital converter (ADC) of a receiving end; and
    output a signal obtained by subtracting the second digital signal and the residual signal from the third digital signal, and
    wherein the attenuation coefficient is set to a value that enables a lowest mean square error of the modulated first digital signal and the first digital signal.

2. The apparatus according to claim 1, further comprising:
    a deinterleaver configured to deinterleave the demodulated first digital signal;
    a channel decoder configured to perform channel decoding of the deinterleaved signal;
    a channel encoder configured to perform channel encoding of the channel decoded signal; and an interleaver configured to interleave the channel encoded signal,
wherein the modulator is further configured to modulate the interleaved signal.

3. The apparatus according to claim 1, further comprising:
an equalizer
configured to output the third digital signal after completion of ADC processing of the receiving end.

4. The apparatus according to claim 1, further comprising:
an inverse fast Fourier transform (IFFT) unit
configured to obtain the second digital signal before IFFT processing.

5. A method for reconstructing a desired signal using a full duplex radio (FDR) scheme, the method comprising:
outputting a first digital signal;
demodulating the first digital signal;
modulating the demodulated first digital signal;
attenuating the modulated first digital signal by applying an attenuation coefficient to the modulated first digital signal;
receiving the attenuated first digital signal and the first digital signal;
transmitting a residual signal to the digital self-interference cancellation unit, the residual signal is obtained by subtracting the attenuated first digital signal from the first digital signal;
receiving a second digital signal before digital-to-analog conversion (DAC) processing is performed by a transmitting end;
receiving a third digital signal obtained after analog to digital conversion (ADC) processing is performed by a receiving end; and
outputting a signal obtained by subtracting the second digital signal and the residual signal from the third digital signal,
wherein the attenuation coefficient is set to a value that enables a lowest mean square error of the modulated first digital signal and the first digital signal.

6. The method according to claim 5, further comprising:
deinterleaving the demodulated first digital signal;
performing channel decoding of the deinterleaved signal;
performing channel encoding of the channel decoded signal; and
interleaving the channel encoded signal,
wherein modulating the demodulated first digital signal comprises modulating the interleaved signal.

7. The method according to claim 5, wherein the third digital signal is output after completion of ADC processing of the receiving end.

8. The method according to claim 5, wherein the second digital signal is obtained before inverse fast Fourier transform (IFFT).

* * * * *